United States Patent [19]

McWhirter

[11] Patent Number: 4,717,973
[45] Date of Patent: Jan. 5, 1988

[54] RECORDED INFORMATION VERIFICATION SYSTEM

[75] Inventor: Ian C. McWhirter, Hornsby, Australia

[73] Assignee: McWhirter Holdings PTY. Limited, Hornsby, Australia

[21] Appl. No.: 847,904

[22] PCT Filed: Jun. 14, 1985

[86] PCT No.: PCT/AU85/00130
§ 371 Date: Mar. 11, 1986
§ 102(e) Date: Mar. 11, 1986

[87] PCT Pub. No.: WO86/00745
PCT Pub. Date: Jan. 30, 1986

[30] Foreign Application Priority Data

Jul. 16, 1984 [AU] Australia ............................. PG6017

[51] Int. Cl.⁴ ........................ G11B 27/36; G11B 5/02; G11B 15/04
[52] U.S. Cl. ....................................... 360/31; 360/27; 360/60
[58] Field of Search ...................... 360/60, 27, 31, 53

[56] References Cited

U.S. PATENT DOCUMENTS 4,477,848 10/1984 McWhirter et al. .................. 360/60

Primary Examiner—Vincent P. Canney
Attorney, Agent, or Firm—Ladas & Parry

[57] ABSTRACT

A system for recording and reproducing an audio, video and/or data message with facility for automatically indicating lack of faithful reproduction of the message originally recorded, which comprises deriving a first data signal representative of the message, generating correlation signal bursts whose interval is determined by a characteristic of the data signal, recording the message and data and correlation signals on a recording medium, recovering from the recording medium the message for playback and the correlation signal, deriving a second data signal from the recovered message and predicting from the second data signal the instant when the recovered correlation signal bursts should occur, and providing an indication whenever the recovered correlation signal bursts do not occur as predicted.

16 Claims, 3 Drawing Figures

RECORDED INFORMATION VERIFICATION SYSTEM

This invention relates to a system for recording on, and reproducing from, a recording medium information intended for faithful reproduction, and for detecting any alteration to said information which has occurred after the original recording.

BACKGROUND ART

Such a system will find application where it is desirable to make a recording of analogue, or other message, information such as conversations or other forms of audio or video that needs to be played back at a later stage, without the authenticity of the recording being called into question. Typical audio applications would occur with official law enforcement agencies, private investigation bureau, journalism, medical, legal and in many other fields. Application to video information would typically serve for verification of the authenticity of a video recording applicable in similar fields.

The storage of a conversation, message and other information, both analogue and digital, has previously been effected with a degree of verification to bear testimony of a past event or dialogue. U.S. Pat. No. 4,194,222 describes a voice logging communication recording system in which a digital time code is recorded together with the speech and a visual numerical display of the time code provided on playback. In this instance the time code is recorded out of phase between two channels of the recording medium to assist in cancelling the time code subsequently from the recorded audio. This system effectively bears testimony to the time at which the audio was recorded, but the recording medium could be tampered with in various ways to alter the audio and the system would be incapable of detecting such tampering.

Other systems are known which effect scrambling and enciphering of audio and data for recording, and subsequent unscrabmling and deciphering on playback. U.S. Pat. No. 4,004,089 discloses a system for recording a signal altered by a function on a magnetic medium, playing back the signal and operating on it with the same function to ensure accurate data. On the other hand, U.S. Pat. No. 4,193,061 is exemplary of systems used to determine the security of a transmission system. According to this specification, the device utilises a random process unit to generate identical functions at the transmit and receive ends of the system and these functions are then compared at the receive end of the system. U.S. Pat. No. 3,732,364 is of interest pirmarily with respect to its teaching of modulating a code signal with an information signal prior to recording and separating the signals during reproduction. Other forms of systems of this general kind are disclosed in the following U.S. Pats. Nos. 4,126,761; 4,042,565; 3,723,878 and 3,696,207. In many of the above disclosed systems, it will be noted that, a composite signal is produced comprising the audio, and recording thereof is effected on a signal track according to some systems and on multiple tracks of the recording medium in respect of other systems.

A system which has been developed to detect whether or not a recording has been the subject of any one of many forms of tampering is described in U.S. Pat. No. 4,477,848 having a common assignee with the present application. The specification of this application describes a system wherein a message signal is recorded together with a first data signal which is as least partly a function of the message signal, and upon playback a second data signal is produced which is at least partly a function of the message signal recovered from the recording. The two data signals are then compared and a comparison failure is indicative of an alatered recording. As described in that specification recording of the composite message and data signals is effected upon a single track of a magnetic recording tape. However, the compression into the confines of the band width of a single channel of a conventional recording tape has limited the quality of the message at playback and has detracted somewhat from the efficiency of operation of the system. Furthermore, although a high degree of resolution of tampering detection is provided by this system, improvement to embrace every conceivable form of tampering is desirable.

DISCLOSURE OF INVENTION

It is the principal object of this invention to provide a recording and playback system which can be relied upon during playback to detect practically any instance of tampering with the recorded information, and whose efficiency can also be relied upon.

In accordance with this invention there is provided a system for recording on, and reproducing from, a recording medium message information intended for faithful reproduction, and for detecting any alteration to the recorded message information; said system comprising means for deriving a message information signal representative of said message information; an encoder for producing a first data signal indicative of a representative sample of one or more characteristics of the message information signal; transducer means for recording said message information signal and said first data signal upon individual tracks of the recording medium; means for recovering said signals from the recording medium; an encoder for producing a second data signal indicative of a representative sample of said one or more characteristics of the recovered message information signal; means for reproducing the message information contained in the recovered message information signal; and a comparator for comparing the second data signal with the recovered first data signal to indicate that the message information reproduced does not faithfully protray the message information originally recorded whenever said data signals do not correspond within predetermined limits.

According to another form of the invention there is provided a system for recording on, and reproducing from, a recording medium message information intended for faithful reproduction, and for detecting any alteration to the recorded message information; said system comprising means for deriving a message information signal representative of said message information; an encoder for producing a first data signal including data indicative of a representative sample of one or more characteristics of the message information signal; means for deriving a correlation signal based at least in part on said first data signal; transducer means for recording said message information signal, said first data signal and said correlation signal upon at least one track of a recording medium; means for recovering at least the message information signal and the correlation signal from the recording medium; an encoder for producing a second data signal, including data indicative of a representative sample of said one or more characteristics of the recovered message information signal; means for reproducing the message information contained in the recovered message information signal; and means responsive to the content of said second data signal for predicting a characteristic of said recovered correlation signal, and to indicate that at least some of the signals recovered from said recording medium do not faithfully portray at least some of the signals originally recorded whenever the characteristic of said recovered correlation signal is other than predicted.

According to a further form of the invention there is provided a system for recording on, and reproducing from, a recording medium message information intended for faithful reproduction, and for detecting any alteration to the recorded message information; said system comprising means for deriving a message information signal representative of said message information; an encoder for producing a first data signal including data indicative of a representative sample of one or more characteristics of the message information signal; means for deriving a correlation signal based at least in part on said first data signal; transducer means for recording said message information signal, said first data signal and said correlation signal upon at least one track of the recording medium; means for recovering all of said signals from the recording medium; an encoder for producing a second data signal including data indicative of a representative sample of said one or more characteristics of the recovered message information signal; means for reproducing the message information contained in the recovered message information signal; a comparator for comparing the second data signal with the recovered first data signal to indicate that the message information reproduced does not faithfully portray the message information originally recorded whenever said data signals do not correspond within predetermined limits; and means responsive to the content of said second data signal for predicting a characteristic of said recovered correlation signal, and to indicate that at least some of the signals recovered from said recording medium do not faithfully portray at least some of the signals originally recorded whenever said recovered correlation signal is other than predicted.

The invention also provides independent recording apparatus and reproducing apparatus for use with any one of the above-defined systems.

BRIEF DESCRIPTION OF DRAWINGS

The invention will be described in more detail with reference to the accompanying drawings, in which.

BEST MODE OF CARRYING OUT THE INVENTION

Figure 1:
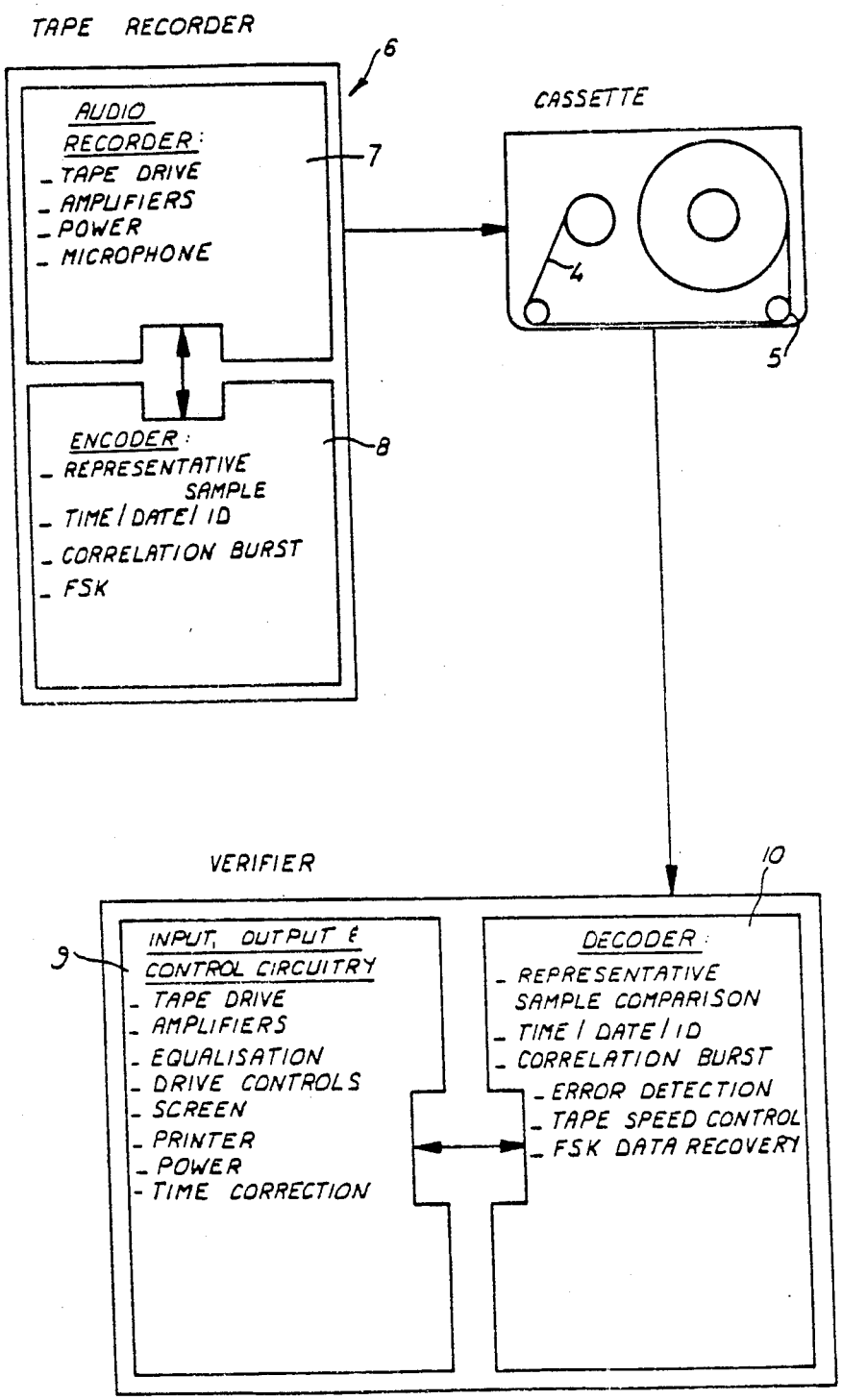
FIG. 1 depicts diagrammatically a system of this invention inclusive of the recorder, the magnetic tape cassette and the verifier.

The systemm as a whole comprises an encoder incorporated with, or in, a recorder, such as a magnetic tape recorder, in order to achieve a verifiable recording of a message information signal representative of message information, and a verifier comprising a decoder and circuitry for reproduction and other functions to verify, i.e. to authenticate, the recorded message information signal on the tape, and to display and print such information as is pertinent to the verification of that recording. Verification is achieved by the creation and recording with the message information signal of a data signal based on a representative message sample of the message information signal. Although the message information may take many forms, such as audio, video or data, for the purpose of illustration it will be regarded hereafter as an audio message from which an audio signal is derived for recording. Hence, preferably but not essentially, the system is composed of two separate items of equipment, e.g. an especially designed recorder using a micro-style cassette from which a recorded magnetic tape may be produced, and a verifier unit for the purpose of playing back the recording from the tape.

For purposes of this invention, a message sample is a sampling of the message information signal which represents a parameter, i.e. a characteristic, of that signal and may be reliant upon:

(a) instantaneous values of the signal;
(b) sampling of the average value of the signal wave form or amplitude envelope measurement;
(c) an envelope measurement of the peak value of the signal;
(d) the differentiated envelope measurement of the signal;
(e) a comparison of envelope measurement related to a previous sample or samples;
(f) a zero crossing or frequency content measurement;
(g) a selective frequency content measurement in one or more frequency bands;
(h) the number of zero crossings occurring in a time slot;
(i) the number of zero crossings occurring in a frequency band; or
(j) any combination of one or more of the above sample forms or any other sampel form to characterise the message information signal by representative sampling of the analogue signal.

For illustrative purposes a preferred construction of the message sampling of a message information signal, for example, an audio signal, is described hereafter and it will be appreciated that the principle of construction of the encoder is substantially unchanged in achieving different methods of deriving message samples, other than that the sampling parameter of the audio will differ in each instance. In all instances it should be noted that the purpose of representative sampling of the audio differs markedly from current practices in that it is not for the purpose of reconstructing the audio nor to scramble the audio information nor can it be considered as digitisation of the audio message. Consequently, the present system is permitted to operate on relatively low bit density which enables recording of data on narrow frequency bandwidth. It is intended that the term "representative sample" of the message information signal shall mean a sample of one or more characteristics of the message information signal, in the present embodiment being an audio signal in any one of the above sampled forms.

A digital data signal provided for verification is recorded on a magnetic tape, by the recording device, and includes data for the representative sample together with data for synchronising signals and data for time, date and the encoder identification number. The data signal as recorded is produced using a Frequency Shift Key (FSK) method to produce a data signal in which a "1" is represented by a low frequency signal, typically 1200 Hz, and a "0" is represented by a high frequency signal, typically 2400 Hz.

A correlation signal is also recorded on the tape and consists of a short signal burst typically of 10 msec to 30 msec, of a frequency, typically of 1000 Hz to 2000 Hz, within the frequency band of the audio message signal. The correlation burst will occur at irregular intervals, typically from 2 sec. to 12 sec., for recording with the audio input. A correlation burst is produced follwoing the occurrence of a predetermined combination of "1's" and "0's" in the digital data signal.

Upon playback of the recording by the verifier, the decoder looks for the occurrence of the predetermined combination of "1's" and "0's" in the data signal when the correlation burst signal should occur. If correclation bursts are detected outside the expected time or if no correlation burst occurs at the expected time, an error will be notified. It is important that the correlation burst signal, that is to be recorded as an integral part of the audio signal, be based in part on the contents of the data signal. Such an arrangement is important should the data signal be removed from the recording, by whatever means, and the audio signal then altered with subsequent re-recording using the same or like device. Then any unaltered correlation bursts of the original recording in addition to the correlation burst recorded during the subsequent re-recording will be detected by the verifier upon playback and notified as an inconsistency.

A further feature of the invention provides for added security in that the verifier derives data signal for a representative sample derived from the audio signal recovered from the magnetic tape. The data for this latter sample is then compared within the varifier with the data signal recovered from the magnetic tape that was recorded for the representative sample obtained when the audio was recorded. An error is notified if an inconsistency is detected between the two data signals. This feature of the system is described in detail in the said U.S. Pat. No. 4,477,848.

Reference is now made to FIG. 1 which shows the basic system layout consisting of a two-track tape recorder 6 having an audio recorder 7 with builtl-in encoder 8 and a verifier with built-in decoder 10. A magnetic tape cassette 5 is the recording medium. A recording is made on one track of the tape 4 of cassette 5 by the audio recorder 7 of the tape recorder 6 of an audio input as detected by the recorder microphone plus correlation bursts with the data in FSK which constitutes a representative sample of the audio signal including the correlation burst together with time, date and the identification number recorded on the other track. The data in FSK, as well as the correlation burst, is generated by the encoder 8. When the tape 4 is played back by the decoder 10 of the verifier, the audio signal, including the correlation bursts, and the data signal will be recovered. The decoder 10 will derive a data signal from the recovered audio signal which it compares with the recovered data signal that the encoder generated based on a representative sample of the audio signal, including the correlation bursts. The decoder 10 also checks for presence and absence of correlation burst, the continuity of time and the consistency of data recorded for the identification number.

Differences detected between the two data signals will be signalled as an error. However, it will be appreciated that an error could be identified at an end of the tape recording due to data loss. Therefore, not all errors are necessarily an indication of a failure of the integrity of the recording. The microprocessor, based on its instruction set, signals to the operator only those errors that are usable to indicate failure of the integrity of the recorder.

A description will follow of the individual parts of the system. They are the encoder 8, the recorder/encoder interface and the decoder 10 and decoder/verifier interface. Conventional circuits are utilized to fulfil the necessary functions and the construction of those circuits will be obvious to one skilled in the art of electronics. Reference hereafter, therefore, for clarity of explanation, will be confined to circuits shown in block diagrammatical form with envelope measurement, by way of example, used for the representative process.

Figure 2:
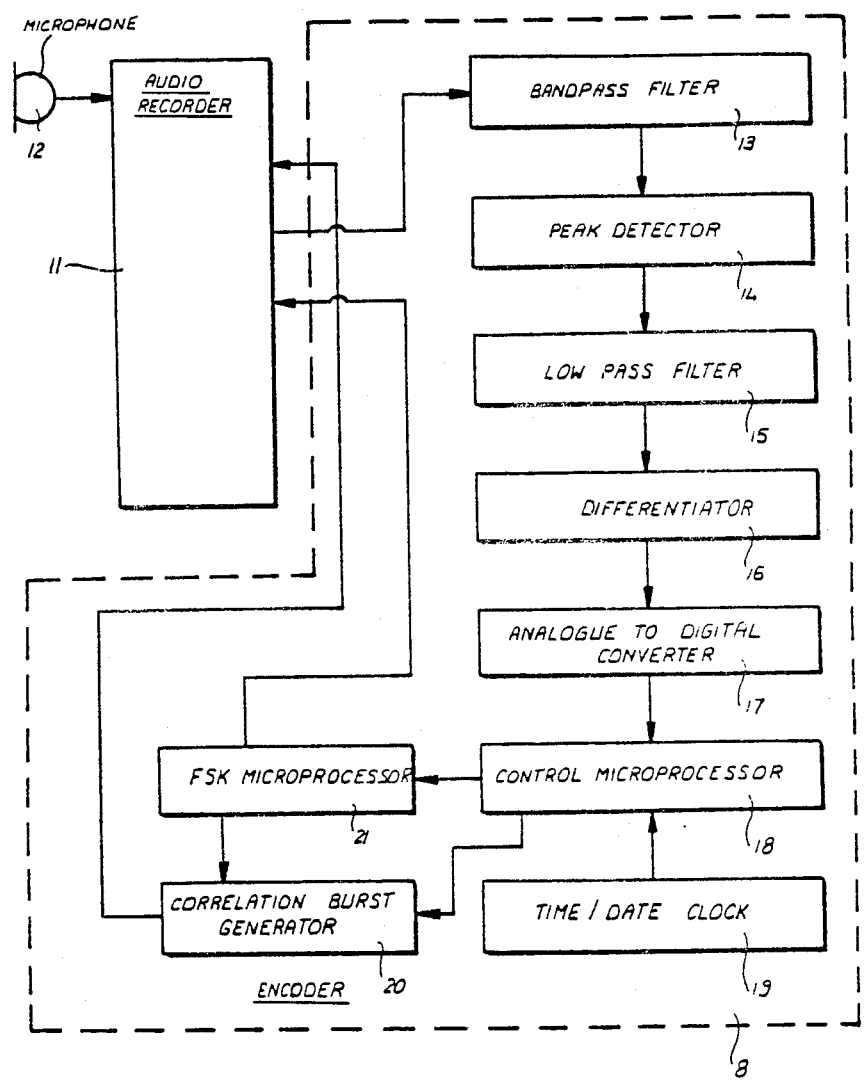
FIG. 2 diagrammatically shows the recorder including encoder.

Reference is now made to FIG. 2 wherein the microphone 12 detects the audio to provide an audio signal which is recorded on one track of the tape. The audio signal is amplified and then presented to the encoder bandpass filter 13 to begin the representative sampling process. The bandpass filter 13, typically from 1000 Hz to 1500 Hz, selects a part of the frequency spectrum of the audio signal that determines to a large extent the intelligibility of the audio message in oral form and consists of a two-stage active filter. In the case of video or other message forms, the bandpass frequency spectrum will be determined by the significant message intelligibility.

The bandpass filter 13 is followed by a peak detector 14 that, in this embodiment, determines the contour or envelope of the bandpass filtered message and ideally consists of a unity gain amplifier with a diode in series with the output drive to the feedback loop, followed by an RC network with values to minimise ripple in the chosen frequency band.

The peak detector 14 is followed by a low pass filter 15, with a cut-off frequency around 20 Hz, to recover the frequency of the contour or envelope of the signal from the peak detector 14. The circuit, ideally consisting of a two-stage active filter, removes the message contour or envelope carrier and minimises further ripple. The low pass filter 15 is followed by a differentiator 16 to accentuate changes in contour or envelope of the signal from the low pass filter 15. The differentiator is followed by a 4-level analogue to digital (A/D) converter 17. The reference levels are set ideally by a voltage divider network from a reference voltage. While a 4-level representative sample of the audio signal is described, the system is adaptive to different bit configurations to suit requirements.

The output from the A/D converter 17 is fed to the control microprocessor 18 to provide a digital representation of the differentiated contour or envelope representative sample of the selected portion of the audio signal frequency spectrum. The control microprocessor 18 receives in addition to the output from the A/D converter 17, time/date from the time/date clock 19 and recovers from its own RAM the encoder indentification number. The time/date is provided by a dedicated setable clock/calendar integrated circuit with its attendant crystal resonator.

Upon programming the volatile memory of the control microprocessor 18, the base start time is loaded. The clock circuit 19 will generate the time, day, month, year elapsed since the device was powered up. Inaccuracies of the resonator are detected during programming and a correction factor is loaded into the volatile memory. Prior to recording onto the tape 4, (FIG. 1), the time is corrected proportionally with the correction factor from the volatile memory in the control processor 18.

An identification number (ID) is also loaded into the volatile memory of the control microprocessor 18 upon programming. The ID consists of the 40 binary digits. Of these 20 are externally determinable. The remaining 20 are set by the encoder itself and are based upon pseudo random factors or events upon powering up the encoder 8. Determining factors or events are the offset of base time, the bit combination of the first data stream for transmission and the time lapse between power applied and programme load (an operator manual entry) in milliseconds. Hence it is virtually impossible to predetermine the encoder determinable part of the ID number.

The data bits for the representative sample, time/date and identification number are assembled and determine, by matching with the predetermined combinatio of "1's" and "0's" which are stored in the microprocessor 18, when a correlation burst is initiated by generator 20. The correlation burst is fed to the audio recorder 11 for recording with the audio received by the microphone and is fed with the audio to the input to the bandpass filter 18. Hence, it will be seen that the correlation burst itself will contribute quantitively to the representative sampling process of the signal. Should the bit combination fail to initiate a correlation burst, then the interval will default to 12 seconds. The minimum interval is determined by the microprocessor and is set to 2 seconds. The correlation burst generator 20 is enabled by the control microprocessor 18 and utilises one of the two frequencies used by the FSK microprocessor 21, typically 1200 Hz.

The output from the control microprocessor 18 of data relating to the representative sample, time/date and identification number is fed in the predetermined order to the FSK microprocessor 21 which converts the data into an FSK signal whereby a low frequency signal represents a "1", typically 1200 Hz, and a high frequency signal, typically 2400 Hz, represents a "0". In addition error detection and correction bits are added to ensure reliable recovery of the data by the decoder 10 (FIG. 1) as well as synchronising bits. The data signal then recorded on the tape 4 contains an update of all information, once a second, for the time and date, ID number and representative sample information.

Figure 3:
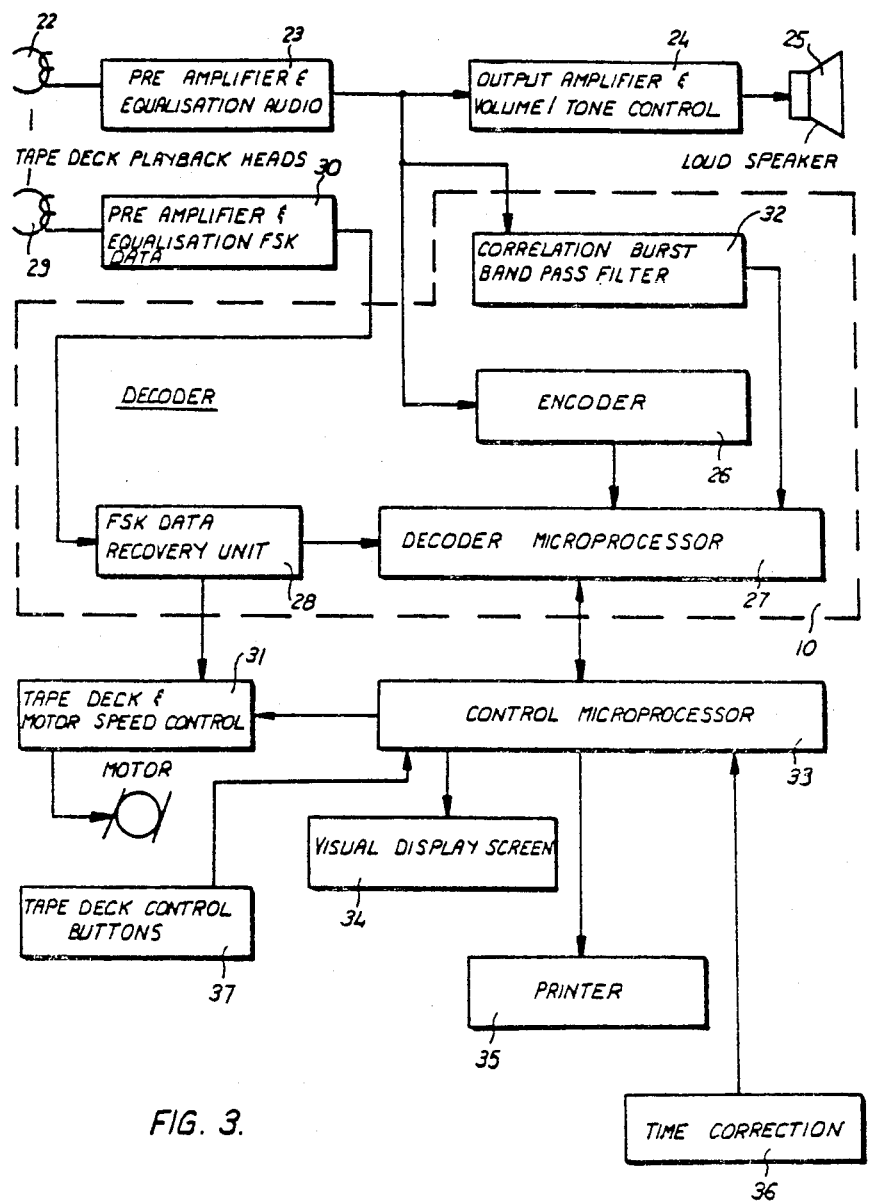
FIG. 3 shows the varifier including decoder.

The verifier is shown in FIG. 3 as comprising decoder 10 while the remainder of the circuitry constitutes the input, output and control circuitry 9 of FIG. 1. The decoder circuitry is the intelligence of the verifier in deciding whether the integrity of the recovered audio and data signals have been impaired. The audio signal, that includes the correlation bursts, is recovered by playback head 22 from the tape 4 (FIG. 4), passes through pre-amp 23 and output amplifier 24 to be converted to sound waves by speaker 25. A representative sample of the signal recovered from the audio track is obtained through an encoder 26 which is an identical circuit to the encoder 8 (FIG. 2) utilized in the tape recorder up to and inclusive of the analogue to digital converter 17 and the same description as provided above applies to this section. The output of encoder 26 is fed to the decoder microprocessor 27. Thus, it will be noted that a second data signal is thereby obtained in this instance from the reproduced audio signal.

The recovery of the FSK data signal on the recorded tape is achieved by data recovery unit 28 via playback head 29 and pre-amp 30 and is fed to the decoder microprocessor 27 and a motor speed control 31. Unit 28 ideally comprises a phase locked loop that determines if there is FSK data present and if FSK data is present locks onto the incoming signal within preset limits. Discriminators sense the difference in expected data rate from the actual data rate presented at the playback tape speed and this difference is then used to drive a feed-back loop for the motor speed of the playback deck through control 31 so that at all times the tape playback speed is the same as when it was recorded.

A very sharp band-pass filter 32 is provided to detect the presence or absence of the correlation burst in the signal recovered from the audio track. The correlation burst filter 32 is ideally a switched capacitor bandpass filter with centre frequency of 1200 Hz. The centre frequency of the switched capacitor filter is controlled by the clock frequency obtained from the rate data provided during playback. Variation in this clock frequency from the clock frequency used for recording the data is reflected in the playback data rate from the data track serving to compensate the filter centre frequency for correlation burst frequency changes due to tape speed variations. Whether a correlation burst should be present is determined by using the contents of the data signal in the same way as described in the encoder 26 for determining the time when a correlation burst should take place. Its presence or absence being sensed through this filter 32. Any output of the bandpass filter 32 is fed to the decoder microprocessor 27. The decoder microprocessor 27 provides a comparison of the decoder generated data signal with the data signal that was generated in the tape recorder and recorded on the tape 4 (FIG. 1). A match should occur between these data signals if no tampering has occurred with the recorded audio or data signals. If a match does not occur, an error signal is generated and transmitted to the control microprocessor 33. The control microprocessor 33 will indicate this to the operator in the form of a visual display 34 and will provide a hard copy printout by printer 35 of the said information.

It will be noted that the remainder of the verifier, including the decoder, comprising circuits 26 to 28 and 32, is a conventional construction of a control processor and attendant audio (analogue) amplifier. As the original time information is recorded in an arbitrary time zone, suggested to be Greenwich Mean Time (GMT), corrections are applied by time correction unit 36 to the control microprocessor 33 to display the actual time of day of recording, dependent upon the time zone in which the recording took place.

The entire power for the verifier 9 is provided by a conventional switching power supply while the time correction is introduced through a set of thumbwheel switches (not shown) which are in complementary binary coded decimal. Conventional playback deck functions of rewind, forward, stop and play as well as eject are provided by means of buttons 37. Upon detection of ejection of the previous cassette, the motor speed control circuitry is reset to its nominal setting to ensure that the next tape will be compared against the nominal tape speed.

While the correlation burst signal referred to in the preferred embodiment above forms an integral part of the system together with the comparison at the verifier of two representative samples, the correlation burst signal can be incorporated independently as a means of authenticating that the message audio signal and data signal have not been interfered with on the recorded tape. However, it is considered that in the latter instance a lesser degree of protection is provided than with the preferred embodiment.

The audio signal, including the correlation bursts, and data signal may be recorded together on a single track, separated in the frequency response range of the tape. This provision is practical with adequate bandwidth but this, however, is not normally available at reasonable cost with present-day tapes and transducers operating at slow tape speeds. In the described preferred embodiment, use is made of two tracks on the tape, one for the audio signal itself upon which the correlation burst signal is imposed and the other for the data signal. This arrangement achieves economic advantages as well as maximising the clarity of the reproduced message and minimising incidents of false alarms signalled by the verifier.

Whereas a preferred embodiment has been described in the foregoing passages it should be understood that other forms, refinements and modifications are possible within the scope of this invention.

What is claimed is:

1. A system for recording on, and reproducing from, a recording medium message information intended for faithful reproduction, and for detecting any alteration to the recorded message information; said system comprising means for deriving a message information signal representative of said message information; an encoder for producing a first data signal including data indicative of a representative sample of one or more characteristics of the message information signal; means for deriving a correlation signal based at least in part on said first data signal; transducer means for recording said message information signal, said first data signal and said correlation signal upon at least one track of a recording medium; means for recovering at least the message information signal and the correlation signal from the recording medium; an encoder for producing a second data signal, including dta indicative of a representative sample of said one or more characteristics of the recovered message information signal; means for reproducing the message information contained in the recovered message information signal; and means responsive to the content of said second data signal for predicting a characteristic of said recovered correlation signal, and to indicate that at least some of the signals recovered from said recording medium do not faithfully protray at least some of the signals originally recorded whenever the characteristic of said recovered correlation signal is other than predicted.

2. A system as claimed in claim 1, wherein the correlation signal is expressed in bursts of signal occurring at irregular intervals.

3. A system as claimed in claim 2, wherein said first data signal is a digital signal constructed of "1's" and "0's" of respectively low and high frequency pulses, and each of said correlation signal bursts is produced in response to the occurrence of a predetermined combination of "1's" and "0's" in said data signal.

4. A system as claimed in claim 3, wherein said predicting means responds to the occurrence of a predetermined combination of "1's" and "0's" in said second data signal.

5. A system as claimed in claim 3, wherein the characteristic of said recovered correlation signal which is predicted by said predicting means is the instant when each burst of the correlation signal should occur in the recovery thereof from the recording medium.

6. A system as claimed in claim 2, wherein said correlation burst signals are recorded on the same track of the recording medium as the message information signals.

7. A system according to claim 6, wherein the first data signal is recorded on a different track of the recording medium from the track on which said message information signals are recorded.

8. A system according to claim 6, wherein the frequency of the correlation burst signals is located within a midband of the frequency of the message information signal, and said representative sample in respect of said first data signal is derived from a portion of the message information signals located within said midband.

9. A system for recording on, and reproducing from, a recording medium message information intended for faithful reproduction, and for detecting any alteration to the recorded message information; said system comprising means for deriving a message information signal representative of said message information; an encoder for producing a first data signal including data indicative of a representative sample of one or more characteristics of the message information signal; means for deriving a correlation signal based at least in part on said first data signal; transducer means for recording said message information signal, said first data signal and said correlation signal upon at least one track of the recording medium; means for recovering all of said signals from the recording medium; an encoder for producing a seocnd data signal including data indicative of a representative sample of said one or more characteristics of the recovered message information signal; means for reproducing the message information contained in the recovered message information signal; a comparator for comparing the second data signal with the recovered first data signal to indicate that the message information reproduced does not faithfully protray the message information originally recorded whenever said data signals do not correspond within predetermined limits; and means responsive to the content of said second data signal for predicting a characteristic of said recovered correlation signal, and to indicate that at least some of the signals recovered from said recording medium do not faithfully portray at least some of the signals originally recorded whenever said recovered correlation signal is other than predicted.

10. A system as claimed in claim 9, wherein the correlation signal is expressed in bursts of signal occurring at irregular intervals.

11. A system as claimed in claim 10, wherein said first data signal is a digital signal constructed of "1's" and "0's" of respectively low and high frequency pulses, and each of said correlation signal bursts is produced in response to the occurrence of a predetermined combination of "1's" and "0's" in said data signal.

12. A system as claimed in claim 11, wherein said predicting means respsonds to the occurrence of a predetermined combination of "1's" and "0's" in said second data signal.

13. A system as claimed in claim 12, wherein the characteristic of said recovered correlation signal which is predicted by said predicting means is the instant when each burst of the correlation signal should occur in the recovery thereof from the recording medium.

14. A system as claimed in claim 10, wherein said correlation burst signals are recorded on the same track of the recording medium as the message information signals.

15. A system according to claim 14, wherein the frist data signal is recorded on a different track of the recording medium from the track on which said message information signals are recorded.

16. A system according to claim 14, wherein the frequency of the correlation burst signals is located within a midband of the frequency of the message information signal, and said representative sample in respect of said first data signal is derived from a portion of the message information signals located within said midband.

* * * * *